US008452640B2

(12) United States Patent
Kumar et al.

(10) Patent No.: US 8,452,640 B2
(45) Date of Patent: May 28, 2013

(54) PERSONALIZED CONTENT DELIVERY AND ANALYTICS

(75) Inventors: Darshan Kumar, San Ramon, CA (US); Ambili Sudhi, Bangalore (IN); Govindraja Achar, Bangalore (IN); Pankesh Jhaveri, North Brunswick, NJ (US); Anil Billapati, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 278 days.

(21) Appl. No.: 12/363,411

(22) Filed: Jan. 30, 2009

(65) Prior Publication Data

US 2010/0198654 A1   Aug. 5, 2010

(51) Int. Cl.
*G06Q 10/00* (2012.01)

(52) U.S. Cl.
USPC .......................... 705/7.32; 715/207; 715/203

(58) Field of Classification Search
USPC .................. 705/7, 10; 715/203, 207, 239
See application file for complete search history.

(56) References Cited

U.S. PATENT DOCUMENTS

| | | | |
|---|---|---|---|
| 6,055,507 A | 4/2000 | Cunningham | |
| 6,161,176 A | 12/2000 | Hunter et al. | |
| 6,188,401 B1 | 2/2001 | Peyer | |
| 6,229,537 B1 | 5/2001 | Sobeski et al. | |
| 6,430,591 B1 | 8/2002 | Goddard | |
| 6,453,302 B1 | 9/2002 | Johnson et al. | |
| 6,542,595 B1 | 4/2003 | Hemzal | |
| 6,624,831 B1 | 9/2003 | Shahine et al. | |
| 6,630,946 B2 | 10/2003 | Elliott et al. | |
| 6,636,863 B1 | 10/2003 | Friesen | |
| 6,683,943 B2 | 1/2004 | Wuelly | |
| 6,859,780 B1 | 2/2005 | Cunningham | |
| 6,944,829 B2 | 9/2005 | Dando et al. | |
| 6,952,681 B2 | 10/2005 | McQuade et al. | |
| 6,963,826 B2 | 11/2005 | Hanaman et al. | |
| 6,996,569 B1 | 2/2006 | Bedell et al. | |
| 7,058,890 B2 | 6/2006 | George et al. | |
| 7,107,548 B2 | 9/2006 | Shafron | |
| 7,179,751 B2 | 2/2007 | Smith et al. | |
| 7,219,127 B2 | 5/2007 | Huck et al. | |
| 7,222,305 B2 | 5/2007 | Teplov et al. | |
| 7,240,070 B1 | 7/2007 | Man Cheng et al. | |
| 7,243,336 B2 | 7/2007 | Brockway et al. | |
| 7,249,053 B2 | 7/2007 | Wohlers et al. | |
| 7,406,534 B2 | 7/2008 | Syvanne et al. | |
| 7,467,355 B1 | 12/2008 | Zukowski et al. | |
| 7,590,939 B2 * | 9/2009 | Sareen et al. | 715/731 |

(Continued)

OTHER PUBLICATIONS

Non-Final Office Action issued Dec. 7, 2010 in U.S. Appl. No. 12/363,371.

(Continued)

*Primary Examiner* — Brian Epstein
(74) *Attorney, Agent, or Firm* — Squire Sanders (US) LLP

(57) ABSTRACT

Systems and methods are provided that record details and analytics about a sales call presentation. Presentation materials are stored in the form of digital content in a memory. A first user interface is provided to allow a presenter to select a presentation, and a second user interface is provided to allow a presenter to enter details about the sales call. Analytical data of the presentation is recorded in real-time and the analytical data is stored in a memory, wherein the analytical data is used in part to assess the success of the presentation.

17 Claims, 13 Drawing Sheets

U.S. PATENT DOCUMENTS

| | | | |
|---|---|---|---|
| 7,679,637 B1 | 3/2010 | Kohler | |
| 7,707,513 B2 | 4/2010 | Broda et al. | |
| 7,805,334 B1 | 9/2010 | Huppert | |
| 7,827,481 B1 | 11/2010 | Greenfield et al. | |
| 7,956,869 B1 | 6/2011 | Gilra | |
| 2001/0044731 A1 | 11/2001 | Coffman et al. | |
| 2002/0032501 A1 | 3/2002 | Tilles et al. | |
| 2002/0032582 A1 | 3/2002 | Feeney et al. | |
| 2002/0065683 A1 | 5/2002 | Pham et al. | |
| 2002/0169795 A1 | 11/2002 | Elliott et al. | |
| 2002/0173990 A1 | 11/2002 | Marasco | |
| 2002/0188513 A1 | 12/2002 | Gil et al. | |
| 2003/0004840 A1 | 1/2003 | Gharavy | |
| 2003/0040953 A1* | 2/2003 | Kasler et al. | 705/10 |
| 2003/0066032 A1 | 4/2003 | Ramachandran et al. | |
| 2003/0088442 A1 | 5/2003 | Michael et al. | |
| 2003/0123631 A1 | 7/2003 | Moss et al. | |
| 2003/0144857 A1* | 7/2003 | Lacour et al. | 705/1 |
| 2003/0158947 A1 | 8/2003 | Bloch et al. | |
| 2003/0197366 A1 | 10/2003 | Kusterbeck | |
| 2003/0226111 A1 | 12/2003 | Wirts et al. | |
| 2004/0024740 A1 | 2/2004 | McGeorge | |
| 2004/0056894 A1 | 3/2004 | Zaika et al. | |
| 2004/0113934 A1* | 6/2004 | Kleinman et al. | 345/732 |
| 2004/0138965 A1* | 7/2004 | Laughlin et al. | 705/27 |
| 2004/0141004 A1 | 7/2004 | Cabezas et al. | |
| 2004/0141016 A1 | 7/2004 | Fukatsu et al. | |
| 2004/0187127 A1 | 9/2004 | Gondi et al. | |
| 2004/0205343 A1 | 10/2004 | Forth et al. | |
| 2004/0225528 A1 | 11/2004 | Brock | |
| 2004/0255232 A1* | 12/2004 | Hammond et al. | 715/500 |
| 2005/0039139 A1 | 2/2005 | Schwartz et al. | |
| 2005/0065756 A1 | 3/2005 | Hanaman et al. | |
| 2005/0102192 A1 | 5/2005 | Gerrits et al. | |
| 2005/0108044 A1 | 5/2005 | Koster | |
| 2005/0108295 A1 | 5/2005 | Karimisetty et al. | |
| 2005/0125806 A1 | 6/2005 | Bussler et al. | |
| 2006/0010397 A1 | 1/2006 | Laffey | |
| 2006/0069785 A1 | 3/2006 | Barrett | |
| 2006/0074775 A1* | 4/2006 | Roman et al. | 705/27 |
| 2006/0085449 A1* | 4/2006 | Sattler et al. | 707/100 |
| 2006/0122971 A1 | 6/2006 | Berg et al. | |
| 2006/0129432 A1 | 6/2006 | Choi et al. | |
| 2006/0136843 A1 | 6/2006 | Shafron | |
| 2006/0190809 A1* | 8/2006 | Hejna, Jr. | 715/500.1 |
| 2006/0247968 A1 | 11/2006 | Kadry | |
| 2006/0293930 A1 | 12/2006 | Rodgers et al. | |
| 2006/0294468 A1* | 12/2006 | Sareen et al. | 715/730 |
| 2007/0016876 A1 | 1/2007 | Schultz | |
| 2007/0186167 A1* | 8/2007 | Anderson | 715/730 |
| 2007/0192192 A1 | 8/2007 | Haberman et al. | |
| 2007/0203785 A1 | 8/2007 | Thompson et al. | |
| 2007/0203851 A1 | 8/2007 | Sudhi | |
| 2007/0220039 A1* | 9/2007 | Waldman et al. | 707/102 |
| 2007/0226027 A1 | 9/2007 | Chang | |
| 2007/0226082 A1 | 9/2007 | Leal | |
| 2007/0294612 A1* | 12/2007 | Drucker et al. | 715/500.1 |
| 2008/0103821 A1 | 5/2008 | Cerbone et al. | |
| 2008/0103856 A1 | 5/2008 | Ciszkowski et al. | |
| 2008/0109286 A1* | 5/2008 | Johnson et al. | 705/7 |
| 2008/0114709 A1 | 5/2008 | Dixon et al. | |
| 2008/0126179 A1* | 5/2008 | Norfolk et al. | 705/10 |
| 2008/0134077 A1 | 6/2008 | Cheng et al. | |
| 2008/0140449 A1 | 6/2008 | Hayes | |
| 2008/0172603 A1* | 7/2008 | Agarwal et al. | 715/239 |
| 2008/0184157 A1 | 7/2008 | Selig | |
| 2008/0250433 A1 | 10/2008 | Orton et al. | |
| 2008/0271059 A1 | 10/2008 | Ott et al. | |
| 2008/0320509 A1* | 12/2008 | Gustafson et al. | 725/23 |
| 2009/0024647 A1 | 1/2009 | Hein | |
| 2009/0077170 A1 | 3/2009 | Milburn et al. | |
| 2009/0125850 A1 | 5/2009 | Karstens | |
| 2009/0125907 A1 | 5/2009 | Wen et al. | |
| 2009/0210796 A1* | 8/2009 | Bhogal et al. | 715/730 |
| 2009/0248646 A1* | 10/2009 | Probst et al. | 707/3 |
| 2009/0254828 A1* | 10/2009 | Denoue et al. | 715/723 |
| 2009/0265255 A1 | 10/2009 | Jackson et al. | |
| 2009/0305217 A1* | 12/2009 | Mulcahy et al. | 434/362 |
| 2009/0327934 A1* | 12/2009 | Serpico et al. | 715/764 |
| 2010/0037168 A1 | 2/2010 | Thayne et al. | |
| 2010/0049699 A1* | 2/2010 | Benschoter et al. | 707/3 |
| 2010/0114985 A1* | 5/2010 | Chaudhary et al. | 707/803 |
| 2010/0151846 A1 | 6/2010 | Vuong | |
| 2010/0161713 A1 | 6/2010 | Gangadharappa et al. | |

OTHER PUBLICATIONS

U.S. Appl. No. 12/363,371, Darshan Kumar.
U.S. Appl. No. 12/363,385, Darshan Kumar.
U.S. Appl. No. 12/363,402, Darshan Kumar.
U.S. Appl. No. 12/363,517, Darshan Kumar.
U.S. Appl. No. 12/362,398, Darshan Kumar.
U.S. Appl. No. 12/362,406, Darshan Kumar.
U.S. Appl. No. 12/362,409, Darshan Kumar.
U.S. Appl. No. 12/362,416, Darshan Kumar.
Oracle, "Siebel Mobile Solutions," Oracel Data Sheet, 2007, pp. 1-4.
Office Action U.S. Appl. No. 12/362,406 dated Mar. 21, 2011.
Office Action U.S. Appl. No. 12/363,371 dated Mar. 25, 2011.
Office Action dated Jun. 8, 2011 issued in U.S. Appl. No. 12/362,409.
Kunau, Timothy M., "Enterprise Architecture, Life Sciences, and Visualization", Oct. 4, 2006, 2 pages.
"The Telemarketing Sales Rule", Published by Consumers a Helpful Guide on Sep. 1, 2005, pp. 1 and 2.
"Data Services Made Easy for Adobe Flex Applications", Flex Developer Boot Camp Sep. 23, 2007, Santa Clara, CA., pp. 1-9.
"Boehringer Inglhein Holland Experiences Significant Increase in Customer Satisfaction in 12 Months Using Siebel Pharma", Business Wire, NY p. 1, Mar. 2004.
"Business Update; CSSC Completes Siebel Systems Validations for Three Pharmaceutical Firms", Health and Medicine Week, Atlanta, p. 346, May 25, 2006.
"Demantra Introduces Demantra Suite 4.0—Software That Offers Ten Times Return on Investment by Managing Product Demand"; Business Wire, NY, p. 1, Apr. 2, 2001.
"iAnywhere Prescribes Mobile Technology to Eli Lily's Italian Sales Team", PR Newswire, NY, p. 1, Mar. 22, 2004.
"Novo Nordisk Expands Siebel Pharma Deployment to Optimize European Sales Effectiveness", Business Wire, NY, p. 1, May 2003.
Oracle Licenses CIC's of eSignature Technology for Siebel Handheld for Pharma and Siebel Handheld for Service, PR Newswire, NY, Jan. 9, 2007.
Siebel Life Sciences Guide, Version 7.8, Rev. A Sep. 2005 pp. 1-108 http://www.erp100.com/document/Siebel/Version7.8/B31104_01/books/PDF/LSSIA.pdf.
Siebel Pharma Dynamic Sales for Pharmaceutical Biotechnology Companies, An Oracle White Paper, Customer Relationship Management and Business Analytics, Jun. 2006 http://www.oracle.com/us/industries/life-sciences/042929.pdf.
Siebel Pharma Handheld Guide, Version 7-7, Siebel Systems, Jun. 2004.
Siebel Pharma Handheld Guide, Version 7-8, May 2005 http://download.oracle.com/docs/cd/B31104_02/books/PDF/HHPharm.pdf.
Siebel Systems Inc., Siebel Enterprise Applications, Siebel Interactive Guide, Siebel 99, Version 5-5, 10PA1-A101-05500, Jun. 1999.
Siebel Life Sciences Guide, Version 7.8, Rev. A Sep. 2005 pp. 109-230 http://www.erp100.com/document/Siebel/Version7.8/B31104_01/books/PDF/LSSIA.pdf.
Siebel Life Sciences Guide, Version 7.8, Rev. A Sep. 2005 pp. 231-358 http://www.erp100.com/document/Siebel/Version7.8/B31104_01/books/PDF/LSSIA.pdf.
Siebel Life Sciences Guide, Version 7.8, Rev. A Sep. 2005 pp. 359-464 http://www.erp100.com/document/Siebel/Version7.8/B31104_01/books/PDF/LSSIA.pdf.
Oracle Siebel Life Sciences Guide, Version 7.7, Rev. C, Jun. 2007.
Oracle Siebel Life Sciences Guide, Version 7.8, Rev. C, May 2008.
Oracle Siebel Pharma Handheld Guide, Version 8.0, Rev. A, May 2007.
Oracle Data Sheet, "Siebel Mobile Solutions," Copyright 2007.
Oracle White Paper, "Oracle CRM for Life Sciences—Closed Loop Marketing Solution for the Pharmaceutical Sales Model," Copyright 2009.
Oracle White Paper, "Siebel Pharma Dynamic Sales Solution," Copyright 2006.
Oracle Quality Implementation Guide, Release 12, Part No. B31579-01, Dec. 2006, pp. 1-326.

\* cited by examiner

PERSONALIZED CONTENT DELIVERY AND ANALYTICS

FIELD OF THE INVENTION

One embodiment is directed to customer relationship management, and more particularly directed to a personalized content delivery system.

BACKGROUND INFORMATION

In recent years, the annual rate of increase among physicians has remained relatively flat while the number of pharmaceutical sales representatives has grown considerably overall, even accounting for recent reductions in field force sizes. As a result, sales call effectiveness has waned in the face of a changing market and physicians' increasingly busy schedules, forcing life sciences organizations to transform their sales and marketing capabilities. Pharmaceutical companies face stiff challenges in terms of completion, cost escalation and reduction in margins, while promoting their products by sending out sales representatives to doctors, hospitals and other medical organizations. Typically the sales representatives, in the few minutes that they get with the audience/doctors, orally explain the complicated details of the medical product and then give handouts, such as presentation material on the product in paper form. A very likely result of such an approach is that after the session the audience would have already forgotten much, depending on the oral presentation skills of the representative, and the handouts most likely be thrown away. Furthermore, the sales representative may not come away with a written or other record of the presentation such as how much time was spent addressing the various details of the product.

SUMMARY OF THE INVENTION

One embodiment is a method for recording details and analytics about a sales call presentation. The method comprises storing presentation material in the form of digital content in a memory, providing a first user interface to allow a presenter to select a presentation, providing a second user interface to allow a presenter to enter details about the sales call, and recording analytical data of the presentation in real-time and storing the analytical data in a memory, wherein the analytical data is used in part to assess the success of the presentation.

BRIEF DESCRIPTION OF THE DRAWINGS

FIG. 3 illustrates an example user interface ("UI") of the PCD system in accordance with an embodiment;

FIG. 5 illustrates another example message planning UI of the PCD system in accordance with an embodiment;

FIG. 11 illustrates another example call details UI of the PCD system in accordance with an embodiment;

DETAILED DESCRIPTION

Embodiments are directed to systems and methods for recording details and analytics about a sales call presentation. Presentation materials are loaded onto a Personalized Content Delivery ("PCD") system. That system provides a user interface to allow a presenter to select a presentation for a sales call. The system also provides a user interface to allow the presenter to enter details about the sales call, such audience participants, duration, location, etc. The system further records analytical data regarding the presentation in real-time and stores the analytical data in memory. The analytical data may be used later to assess the success of the presentation.

Figure 1:
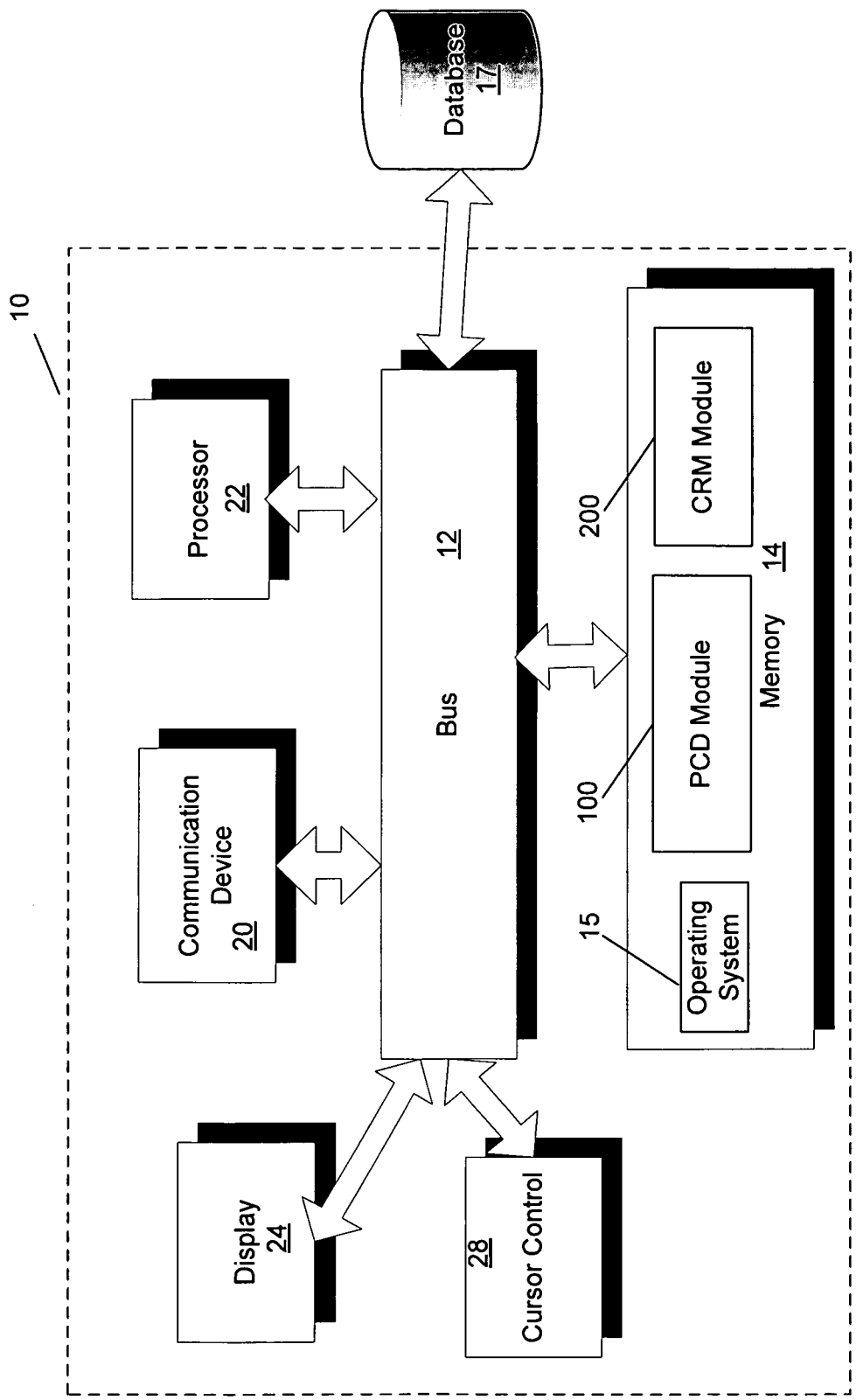
FIG. 1 is a block diagram of a system that can implement a personalized content delivery ("PCD") system in accordance with an embodiment.

FIG. 1 is a block diagram of a system 10 that can implement an embodiment of a PCD system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A cursor control device 28, such as a touch screen, is further coupled to bus 12 to enable a user to interface with system 10. In one embodiment, system 10 is a tablet PC.

In one embodiment, memory 14 stores software modules that provide functionality when executed by processor 22. The modules include an operating system 15 that provides operating system functionality for system 10. The modules further include a PCD module 100. This module is described in greater detail below. System 10 may further include other modules, for example, customer relationship management ("CRM") module 200, with which PCD module 100 may interact. System 10 may further coupled to a database 17 for storing additional data.

Figure 2:
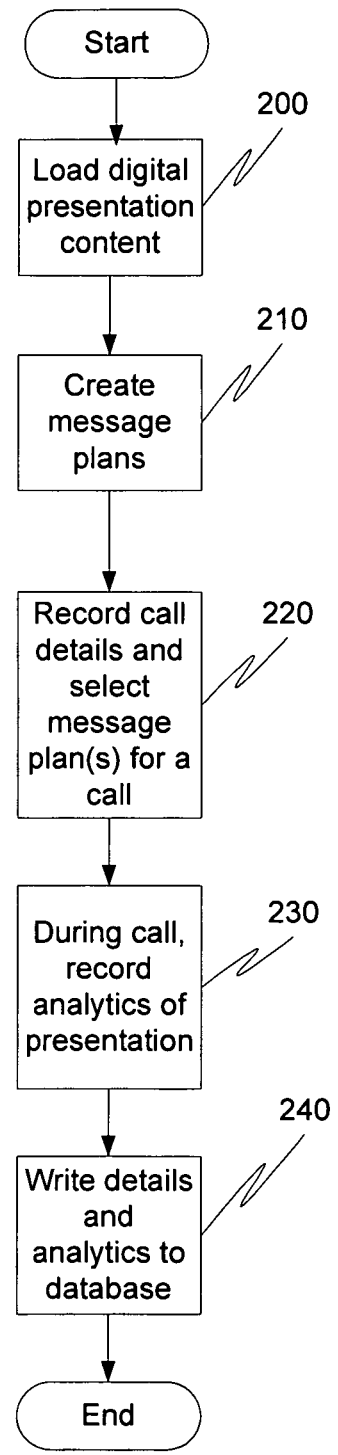
FIG. 2 illustrates a method of providing personalized content delivery and analytics in accordance with an embodiment.
Figure 3:
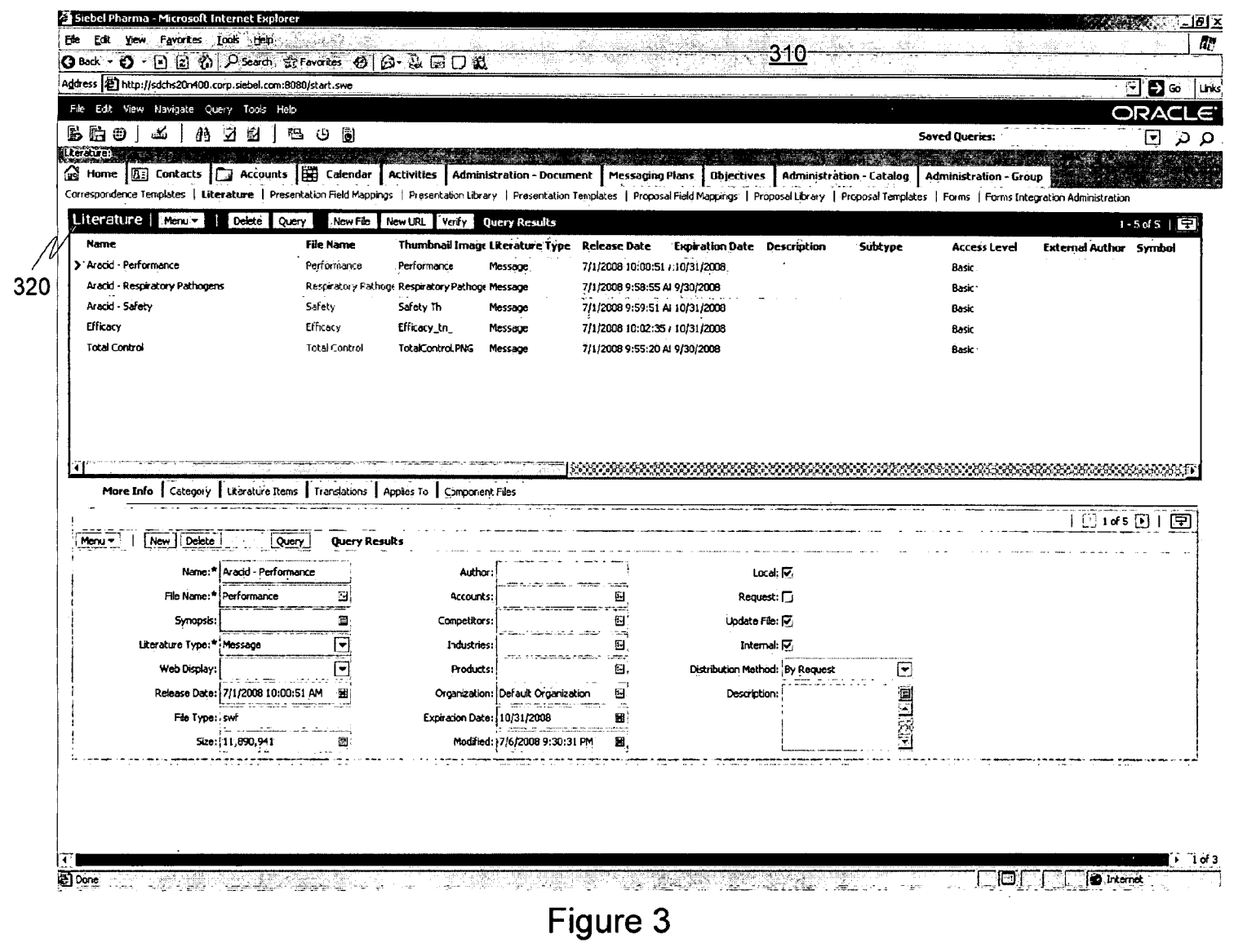

FIG. 2 illustrates a flow diagram of the functionality of PCD module 100 in accordance with an embodiment. In one embodiment, the functionality of the flow diagram of FIG. 2, and FIG. 10 below, is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. Initially, digital presentation content is loaded on the PCD system 10 (200). Digital presentation content may be used by brand managers, marketing managers and sales operation managers as a sales communication tool for more effective communication in order to acquire, retain and develop profitable customer relationships and improve marketing and sales effectiveness. Examples of digital presentation content includes presentations in the form of Flash files, PowerPoint files, word documents, movie files, Portable Document files, etc. A "message" refers to a slide, page or segment of a presentation conveying a specific message that managers wish to track. FIG. 3 illustrates an example screenshot of a user interface ("UI") 310 for PCD system 10 where an administrator or manager may load and manage digital presentation content. For example, UI 310 includes a literature panel 320 for displaying the various literature available for a particular product. In this case, the messages that can be displayed include messages regarding the performance, respiratory pathogens, safety, efficacy, and control associated with the product "Aracid." The literature may be, for example, a slide or slides with information about the product.

Figure 4:
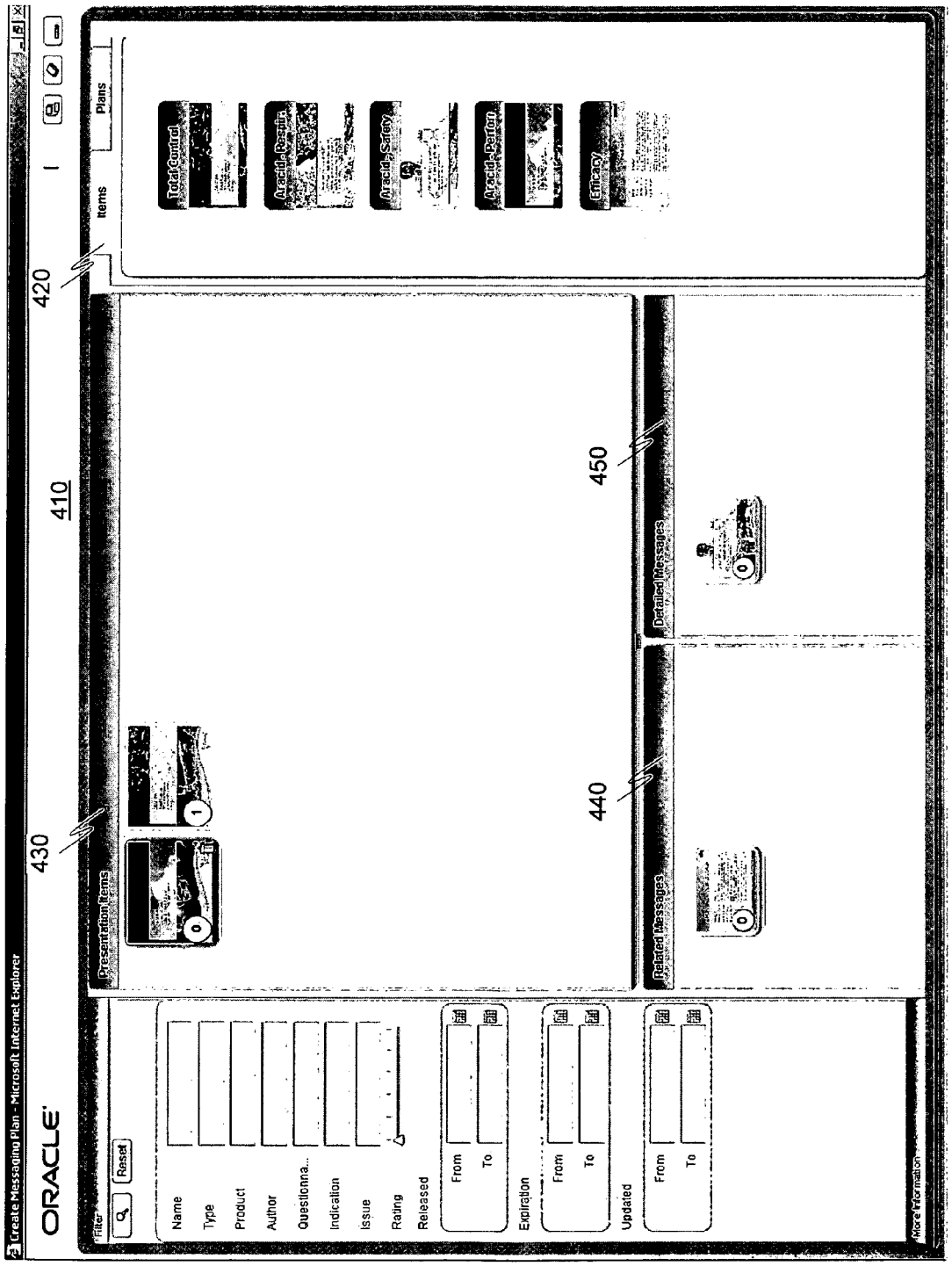
FIG. 4 illustrates an example message planning UI of the PCD system in accordance with an embodiment.

After loading the digital presentation content on PCD system 10, an administrator or manager may then create a "messaging plan" for the sales representative to use from the digital presentation content that was loaded using UI 310 (210). The messaging plan is a sequence of digital presentation content used to deliver the tracked message regarding the product. Whereas UI 310 allows an administrator to load content onto PCD system 10, PCD system 10 further includes a UI for creating the messaging plans from the digital presentation content. FIG. 4 illustrates an example screenshot of a UI 410 for PCD system 10 where an administrator or manager may create messaging plans. Note that messages from items panel 420 may be drag-and-dropped into presentation panel 430. The UI 410 may also include related messages section 440 and detailed messages section 450. The administrator or manager may drag-and-drop messages that are related to a message into related messages section 440. The administrator or manager may drag-and-drop messages that provide more details about a particular message into detailed messages section 450. These related and detailed messages may not be part of the regular message plan presentation, but may be displayed during the message plan presentation if a sales representative decides the related or detailed messages are relevant.

Figure 5:
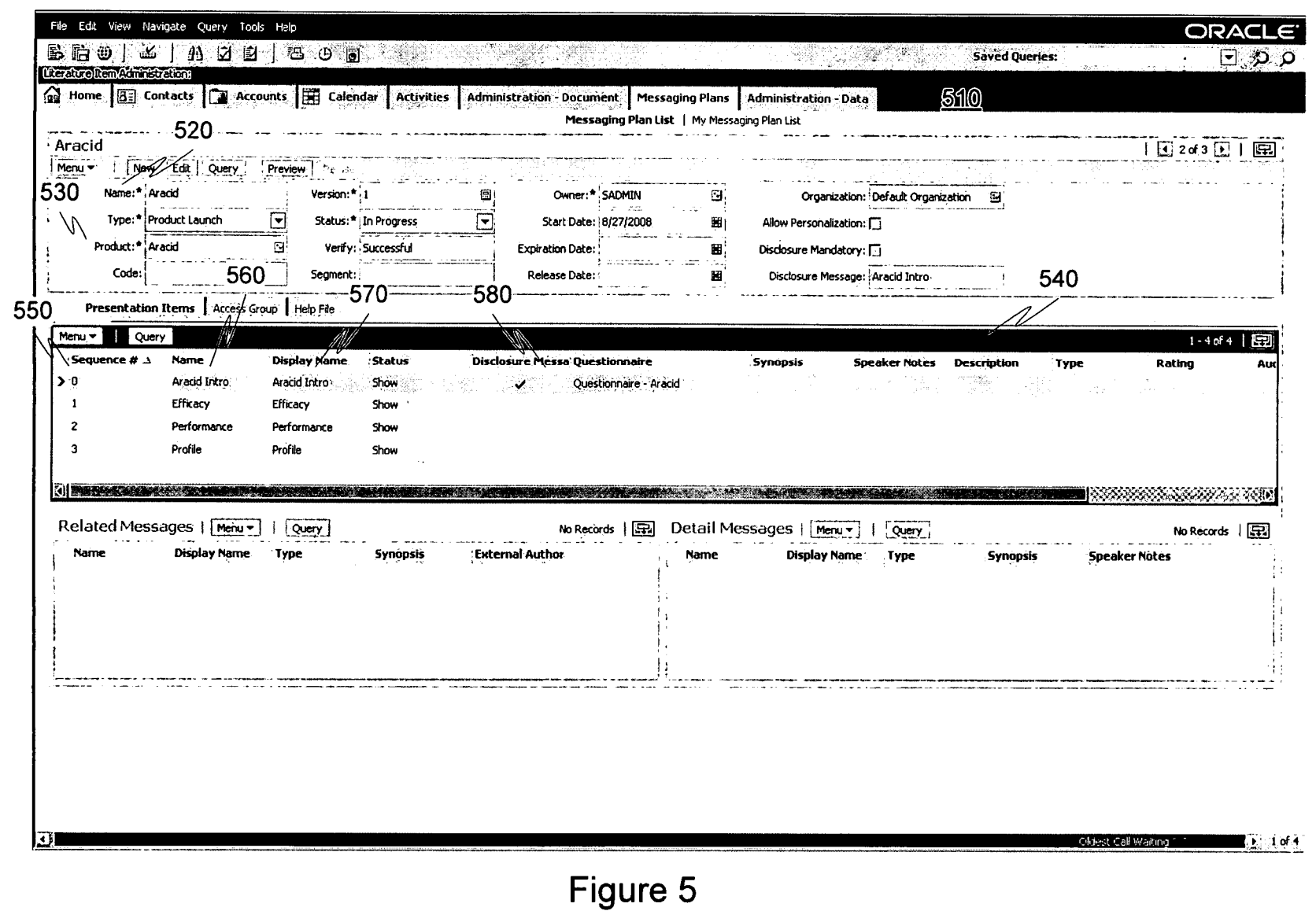

FIG. 5 illustrates an example screenshot of UI 510 for PCD system 10 where an alternative message plan view allows a user to view and change message plan details for a particular message plan. For example, message plan name box 520 indicates the name of the message plan is "Aracid." Message plan product box 530 indicates the product of the message plan is also "Aracid." Message plan details section 540 shows the details of the message plan, including message (slide) sequence number column 550, message name column 560, message display name column 570, and message questionnaire column 580. Related messages section 590 and Detailed messages section 595 include details about related and detailed messages for the message plan, as previously described.

Figure 6:
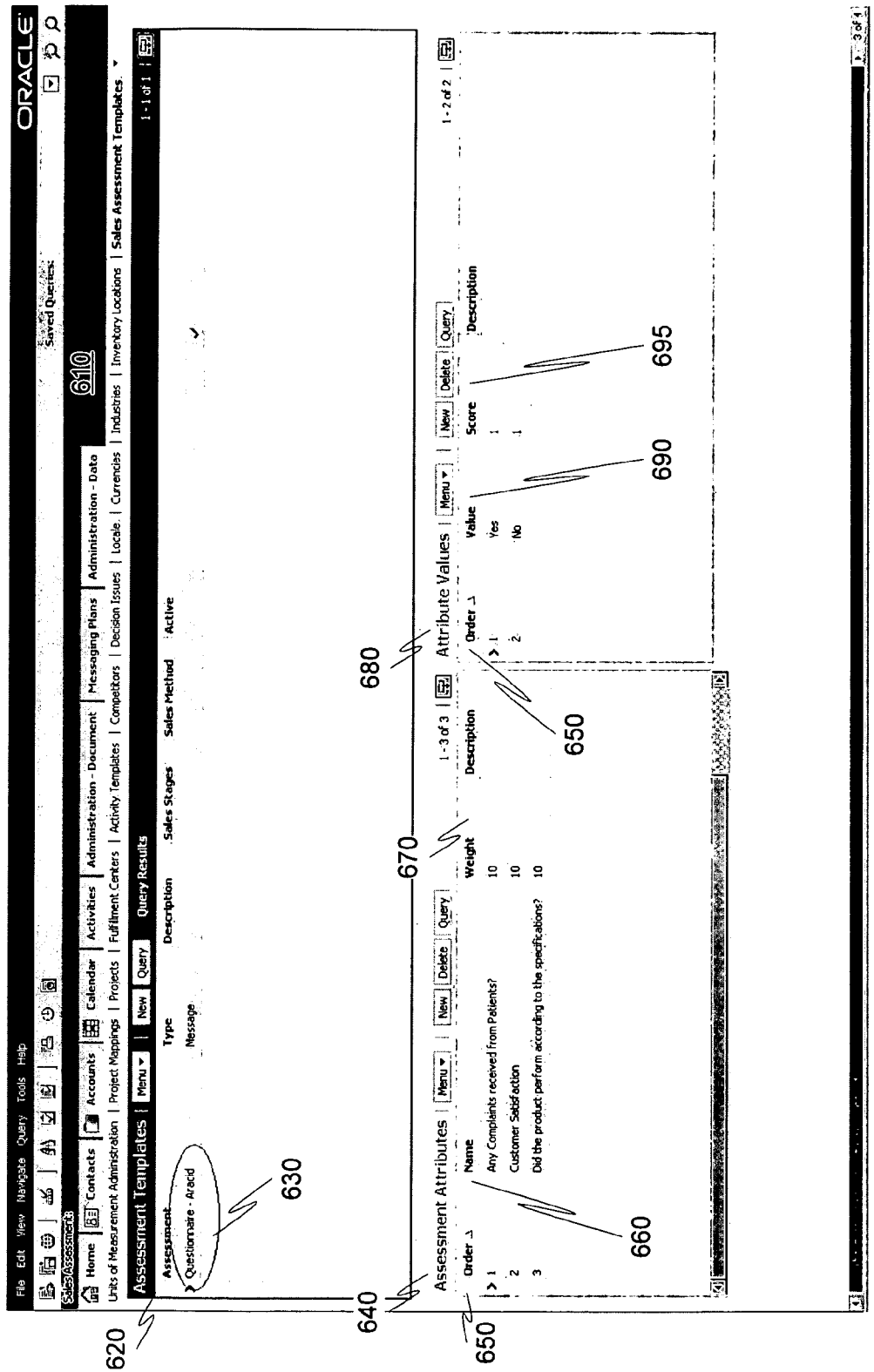
FIG. 6 illustrates a questionnaire planning UI of the PCD system in accordance with an embodiment

Message questionnaire column 580 allows a manager or administrator to associate a questionnaire with a particular message. FIG. 6 illustrates an example screenshot of UI 610 for PCD system 10 where a manager or administrator can manage questionnaires for messages. An assessment (questionnaire) templates section 620 displays available assessment templates (e.g., "Questionnaire—Aracid" 630). Assessment attributes section 640 displays attribute (i.e., questions or ratings) for an assessment. Each attribute includes an attribute order 650, attribute name 660, and attribute weight 670. Attribute value section 680 includes an attribute order corresponding to attribute order 650, attribute value 690 (i.e., an answer to the question or rating), and a score 695 that is awarded if the audience's answer matches the attribute value 690. For example, a sales representative launches Questionnaire—Aracid 630 during a sales call and the sales representative records the answer to the question "Any complaints received from patients" (about the product Aracid). If the audience answer is "yes," this answer matches the attribute value 690 and the question is awarded a score 695 of "1," which is multiplied by attribute weight 670 when a final rating is tallied for Questionnaire—Aracid 630.

Figure 7:
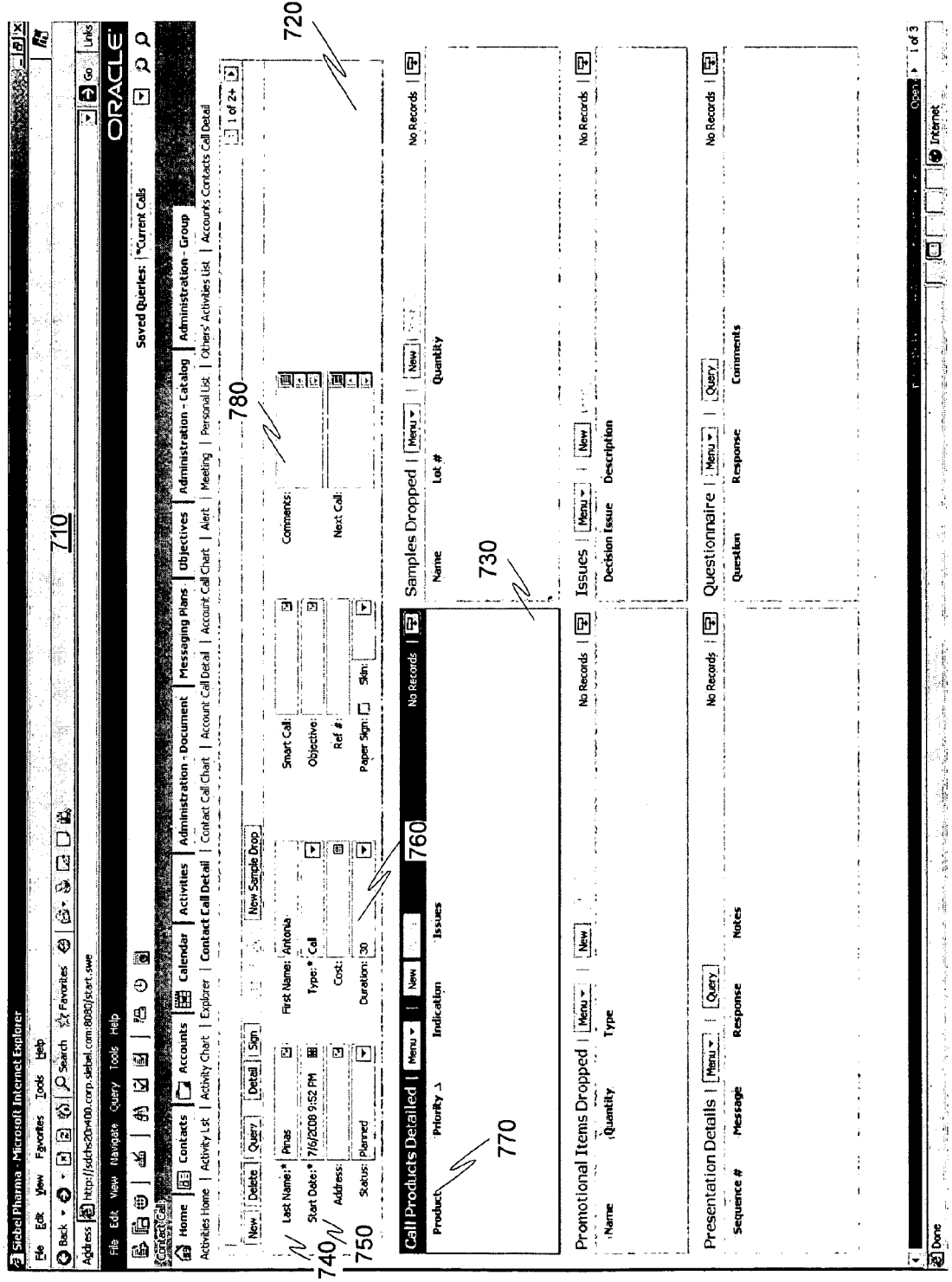
FIG. 7 illustrates an example call details UI of the PCD system in accordance with an embodiment.

Before a sales representative makes a sales call, a messaging plan is selected on the PCD system 10 and details about the call are entered into the system (220). FIG. 7 illustrates an example screenshot of a UI 710 for PCD system 10 where a sales representative may enter call details in details section 720 and product details section 730. Such details may include the doctor or audience of the call 740, the date of the call 750, the duration of the call 760, the product discussed during the call 770, and comments regarding the call 780. During the sales call, the sales representative gives the presentation of the selected message plan(s) and the PCD system 10 dynamically and automatically collects analytical data, such as time spent by the sales representative on each message and the sequence of messages (230). Analytical data collection is explained in greater detail below.

Figure 8:
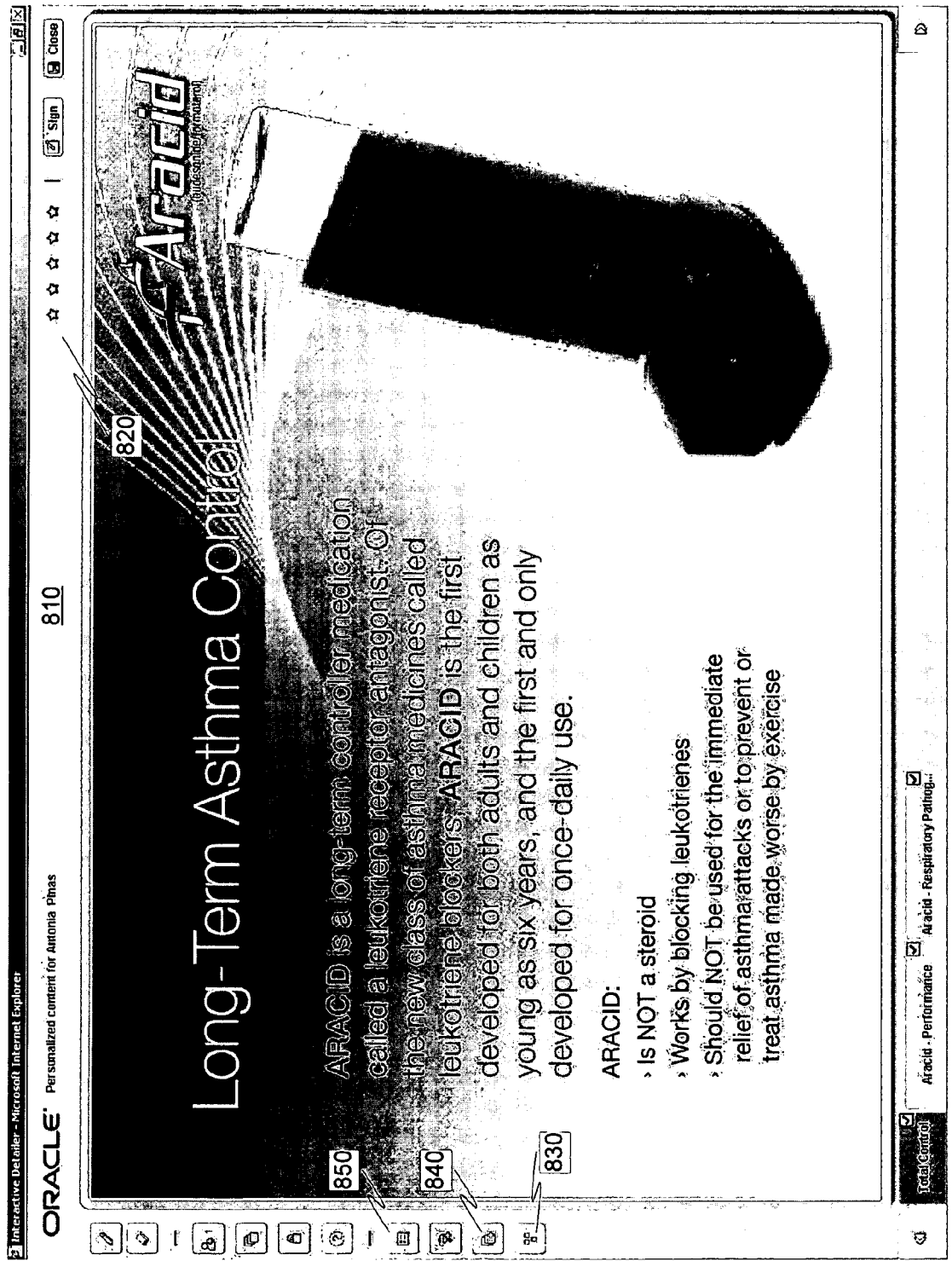
FIG. 8 illustrates an example presentation UI of the PCD system in accordance with an embodiment.

FIG. 8 illustrates an example screenshot of a UI 810 for PCD system 10 where a presentation is in progress and displaying a message during a sales call. UI 810 includes an audience feedback rating section 820, illustrated as a row of stars. After the presentation of a message, the sales representative may poll the audience for feedback on that particular message. For example, the audience response could be "Continue Discussion," "Need Data," "Accepted," "Not Interested," "Rejected," etc., with respect to the audience's reaction to the message. The sales representative selects a star corresponding to the audience response, and this rating is recorded for the message. UI 810 further includes related messages button 830 and detailed messages button 840. During a presentation, the sales manager may use related messages button 830 and detailed messages button 840 to provide the audience with a related message or more details about a message if the sales representative feels that such messages would be helpful. Otherwise, unnecessary related messages and detailed messages need not be included in the presentation.

Figure 9:
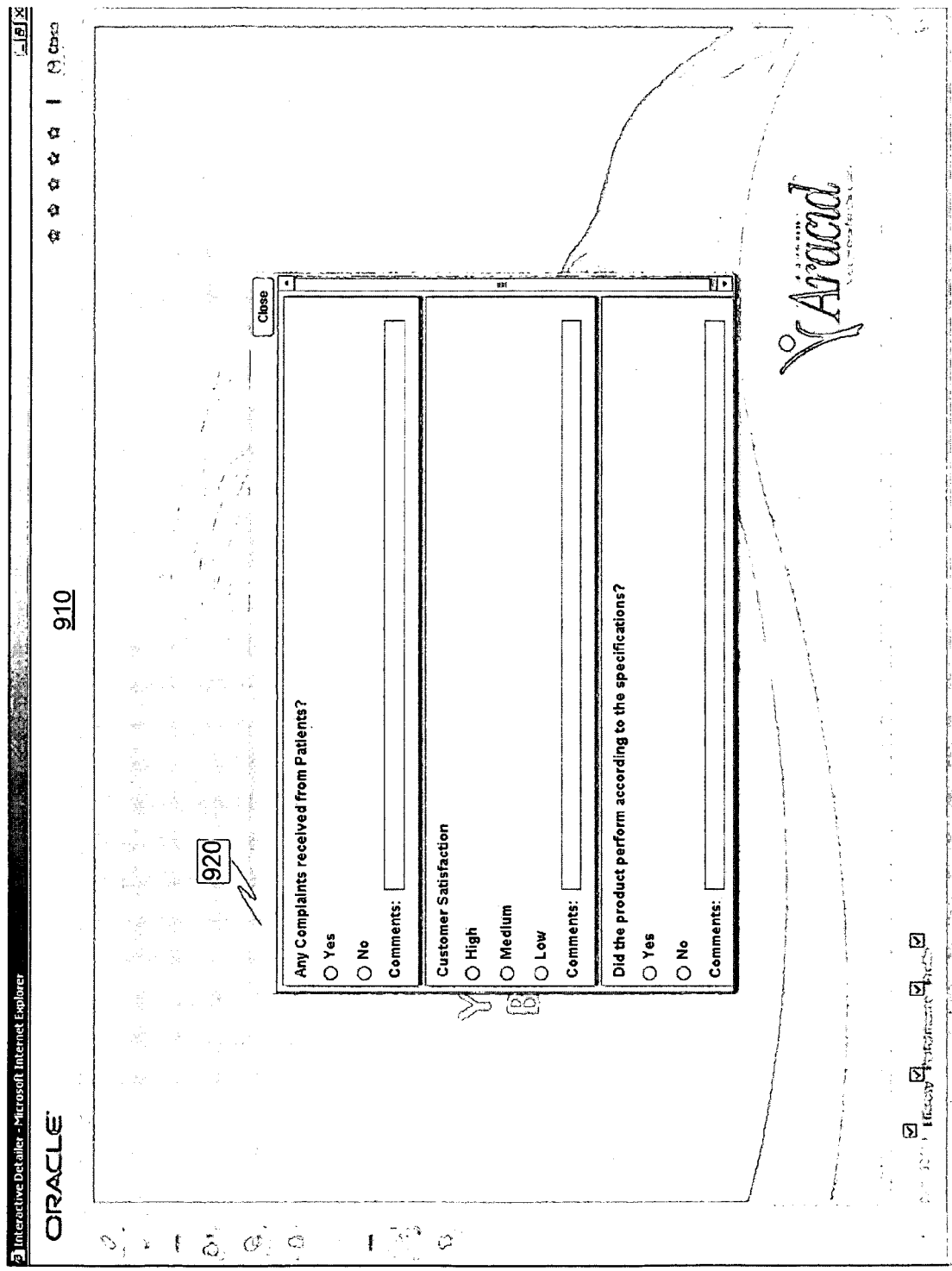
FIG. 9 illustrates an example questionnaire presentation UI of the PCD system in accordance with an embodiment.

UI 810 further includes a questionnaire button 850. When a questionnaire has been associated with a particular message (slide), questionnaire button 850 is highlighted, blinking, or made clickable. At the end of the presentation, the sales manager clicks on button 850 to display the related questionnaire. FIG. 9. illustrates an example screenshot of UI 910 for PCD system 10 where a questionnaire 920 is displayed to the audience. For example, the questionnaire displayed is Questionnaire—Aracid 630. The sales representative collects the audience response to each question and completes the questionnaire, the data for which is recorded.

Figure 10:
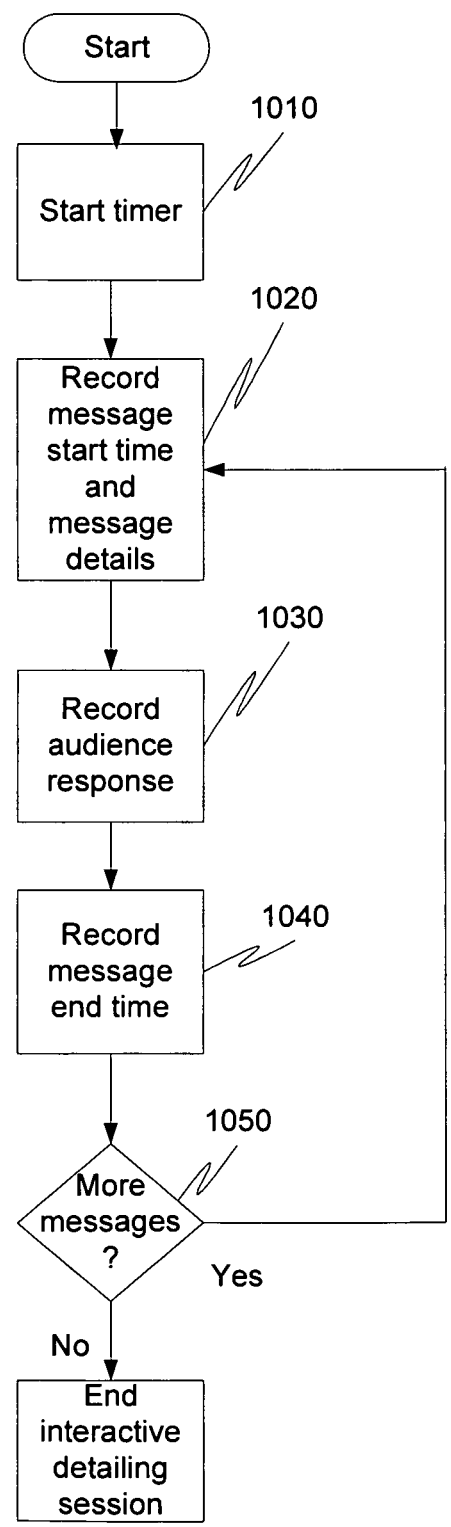
FIG. 10 illustrates a method of recording analytic data in accordance with an embodiment.

FIG. 10 illustrates a flow diagram of the functionality of PCD module 100 when recording analytic data for a sales presentation in accordance with an embodiment (see 230 of FIG. 2). When the presentation begins, a timer is started for recording timing data of the presentation (1010). The start time for a message is recorded, as well as details about the message (1020). Details about the message may include the message name, message plan name, message objective (e.g., product launch), and message offer (e.g., promotional items or samples). After the sales manager is finished with a message, they record the audience response based on the audience's reaction and questions about the message (1030). The end time for the message is recorded when the sales representative navigates away from the message (1040). If there are more messages in the message plan (1050), analytic data is recorded for the next message (1020). Otherwise, the interactive detailing is finished for that message plan (1060). A sample table data structure for recording analytical data is presented below:

| Start Time | End Time | Message Name | MP Name | Objective | Offer | Response |
|---|---|---|---|---|---|---|
| Dec. 31, 2008 2:34 | Dec. 31, 2008 2:40 | Introduction | Aracid | Product Launch | | |
| Dec. 31, 2008 2:40 | Dec. 31, 2008 2:52 | Performance | Aracid | Product Launch | Samples | Accepted |

Figure 11:
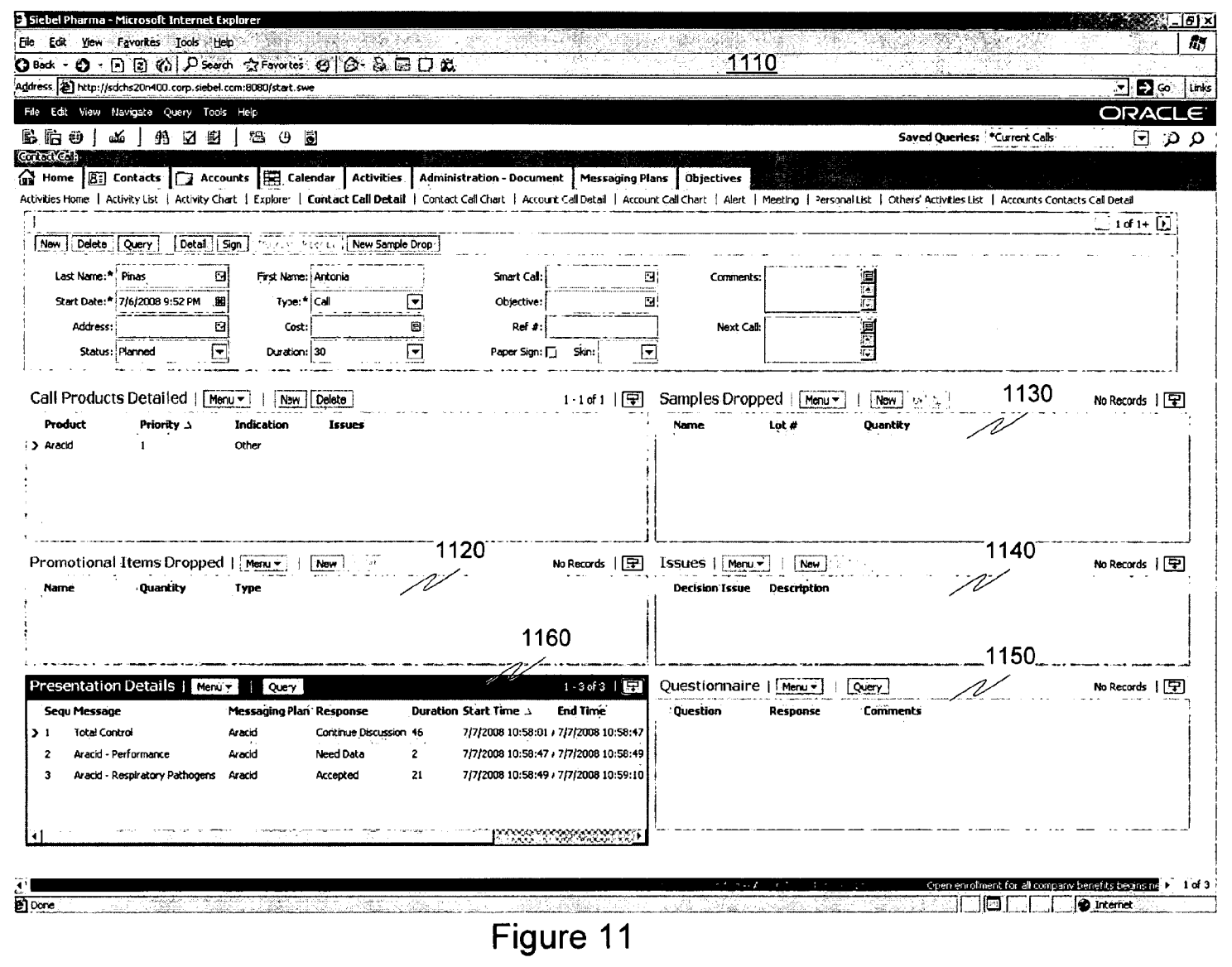

Once the presentation detailing session is over and the interactive detailing is closed, the analytical data collected during the session is written back to database 17 (FIG. 2, 240). Analytical data may include the duration each message was discussed, the message name, the message plan name, the audience reaction to a message, questionnaires and answers for a message, etc. After the call, the sales representative may also enter additional details about the sales call such a samples and promotional items left with the doctor or audience or issues about the call. FIG. 11 illustrates an example screenshot of a UI 1110 for PCD system 10 where the sales representative can enter call details in promotional items section 1120, samples dropped section 1130, issues section 1140, and questionnaires section 1150. The screenshot UI 1110 displays in presentation details section 1160 the messages that were presented to the contact in the detailing session, the sequence of presented messages and their parent messaging plans (i.e., the messaging plan to which the message belongs), and duration of presentation for each message. Ultimately, information about the sales call and other sales calls regarding the same product may be used to develop marketing strategies for that product based on the success of the sales calls.

Figure 12:
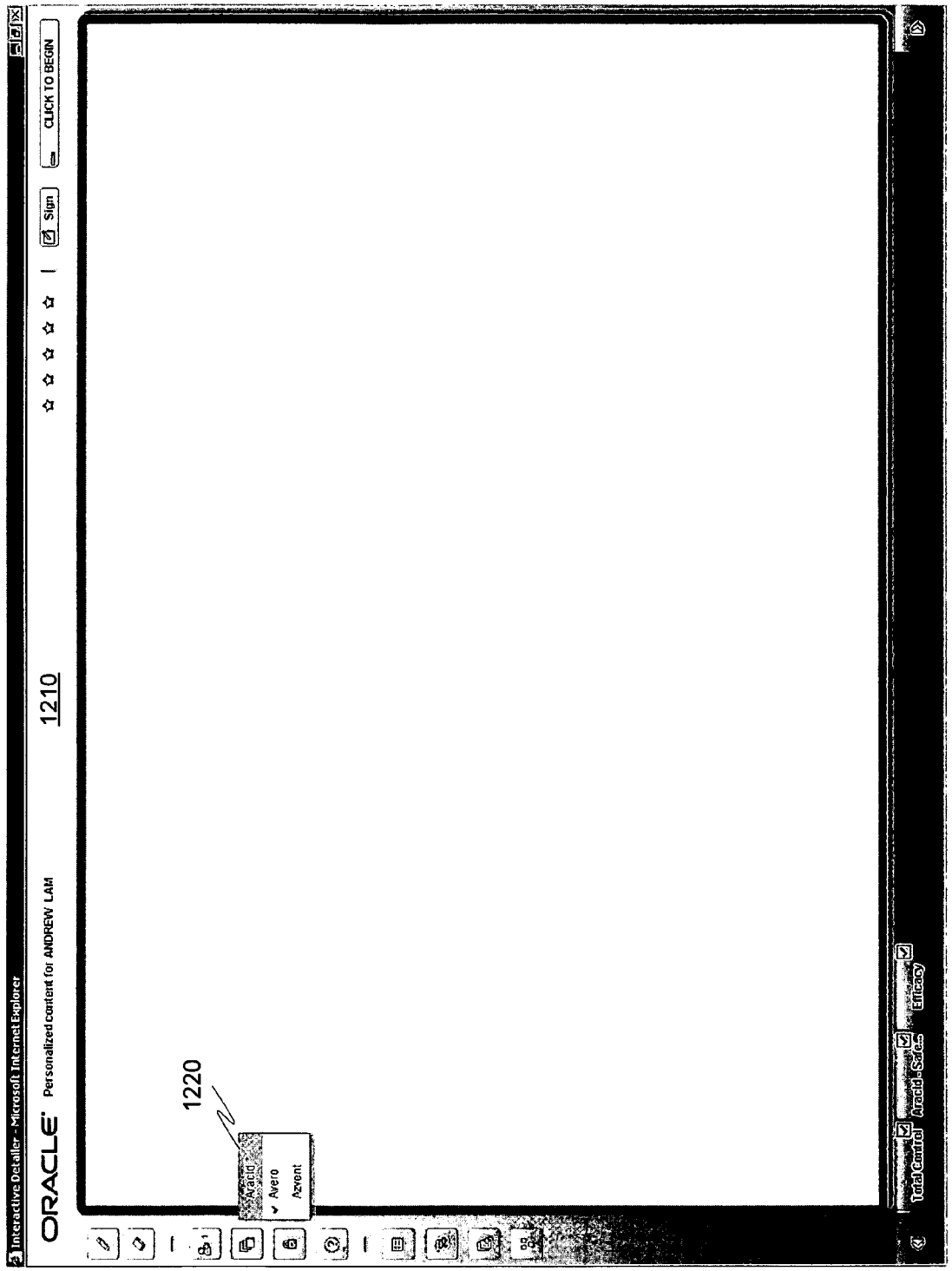
FIG. 12 illustrates another example UI of the PCD system in accordance with an embodiment.

When a sales representative makes a sales call and launches the PCD system 10 for detailing the call, they may choose one or more messaging plans from the many messaging plans available. Depending on various parameters such as the objectives assigned to the sales representative for a particular contact, the sales representative may decide which of the messaging plans available to them is most appropriate for the call. It may be a difficult task to decide which among the many available messaging plans is most appropriate for the call. It may also be difficult to decide what parameters to consider while selecting the appropriate messaging plan, as different users will use different parameters or logic in deciding the appropriate messaging plan. Accordingly, in an embodiment PCD system 10 assists in deciding which of the messaging plans available to the sales representative would be most appropriate for a particular sales call. PCD system 10 determines the most suitable messaging plans for a call based on the objectives assigned to the sales representative for a contact, the specialty of the contact, and the company offers available to various segments of contacts or the segment of contacts targeted in the call. FIG. 12 illustrates an example screenshot of a UI 1210 for PCD system 10 where recommended messaging plans have an "*" character suffixed to its name in the list of available messaging plans. For example, for Dr. Andrew Lam in UI 1210, the messaging plan 1220 for Aracid is recommended, based on the objectives of the sales call set by the sales representative. Messaging plan are associated with objective codes and target segment codes. In this example, the objective selected by the sales representative and the contact details for Dr. Lam match the objective code and target segment code associated with the messaging plan for Aracid.

In one embodiment, PCD system 10 may be used to assist in sales calls in multiple languages. The PCD system 10 presentations may be developed in other languages, but the interface for operating the PCD system 10 should also be selectable among a plurality of languages. Accordingly, PCD system 10 includes in one embodiment a localization feature where the interface components are designed using non-language-specific identifiers. These identifiers are translated to languages supported by corresponding versions of eXtensible Markup Language ("XML") files containing the strings in which that language is loaded. In code these strings are referenced by the XML tags used to define them in the XML file. Depending on which language version of the XML that was loaded, the tags will hold strings in that language. For example, the English version of the XML files is shown below:

```
<?xml version="1.0" encoding="utf-8"?>
<IDS_IDENTIFIERS>
<IDS_SURVEY_TITLE>Questionnaire</IDS_SURVEY_TITLE>
<IDS_GENERIC_TITLE>Details</IDS_GENERIC_TITLE>
<IDS_PANEL_TITLE>Opinion</IDS_PANEL_TITLE>
.........
</IDS_IDENTIFIERS>
```

The Arabic version of the XML shown below:

```
<?xml version="1.0" encoding="utf-8"?>
<IDS_IDENTIFIERS>
<IDS_SURVEY_TITLE>استطلاع رأي</IDS_SURVEY_TITLE>
<IDS_GENERIC_TITLE>تفاصيل</IDS_GENERIC_TITLE>
<IDS_PANEL_TITLE>رأي</IDS_PANEL_TITLE>
......
</IDS_IDENTIFIERS>
```

As with configuring language preferences, users may also desire to configure the layout, look, and feel of various components in the UI. For example, in messaging planning there may be a search component which allows users to search a collection of messages or messaging plans. Users should be able to configure the fields on which users can search a message or messaging plan, aesthetics such as the background or border color of the component, the title of component, etc. Accordingly, the look and feel of the UI of the PCD system 10 is customizable via a component definition XML file.

An example of a component definition file is shown below:

```
<Component_Def>
    <Component Id="SURVEY"
Title="IDS_SURVEY_TITLE" H="X" W="">
        <Control Id="QUE_PANEL" Title="IDS_PANEL_TITLE"/>
        <Control Id="BTN_CLOSE"
        Title="IDS_BTNCLOSE_TITLE"/>
    </Component>
    <Component Id="PASSWORD_DLG"
Title="IDS_PWD_TITLE" H="200" W="220">
        <Control Id="SHORT_ERR"
        Title="IDS_PWDSHORT_ERROR"/>
        <Control Id="LONG_ERR"
        Title="IDS_PWDLONG_ERROR"/>
        <Control Id="MIN_LEN" Value="5"/>
        <Control Id="MAX_LEN" Value="10"/>
        <Control Id="PWDTXT_LBL"
        Title="IDS_PWDTXT_LBL"/>
    </Component>
......
</Component_Def>
```

Figure 13:
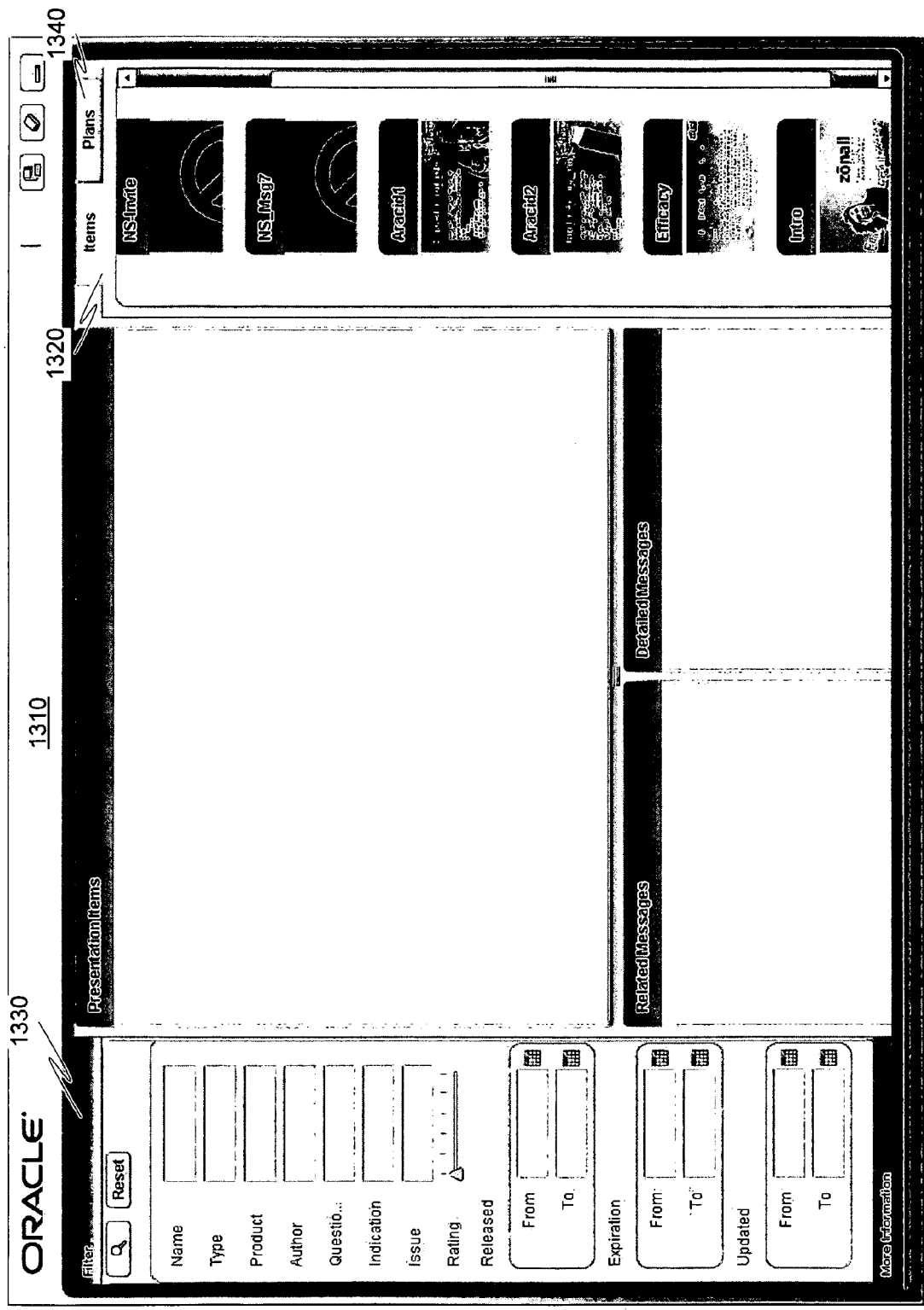
FIG. 13 illustrates another example message planning UI of the PCD system in accordance with an embodiment.

FIG. 13 illustrates a screenshot of the messaging planner UI 1310. Items panel 1320 is a collection of messages that can be selected and filter panel 1330 displays fields with which messages can be filtered. If the messaging plans tab 1340 is selected, a collection of messaging plans is displayed, and filter panel 1330 is refreshed to display fields on which messaging plans can be filtered.

There are two component definitions for filter panel: 1) when items panel 1320 is displayed, filter panel 1330 shows fields on which messages can be filtered and the component definition with Id="SEARCH_TITLE_ID" defines which fields are to be displayed here; 2) when messaging plans tab 1340 is selected, filter panel 1330 shows fields by which messaging plans can be filtered and the component definition with Id="SEARCH_TITLE_MP" defines which fields are to be displayed here. The component definitions for filter panel 1330 are shown below:

For message plans:

```
<Component Id="SEARCH_TITLE_MP"
Title="IDS_SEARCH_CONTAINER_TITLE" H="" W="">
    <Control Id="NAME" Title="IDS_NAME_FIELD_TITLE"
DataType="DTYPE_TEXT" BCField="Name" ChildBCField=""/>
    <Control Id="TYPE" Title="IDS_TYPE_FIELD_TITLE"
DataType="DTYPE_TEXT" BCField="Message_spcPlan_spcType"
ChildBCField=""/>
    <Control Id="PRODUCT"
Title="IDS_PRODUCT_FIELD_TITLE" DataType="DTYPE_TEXT"
BCField="Product" ChildBCField=""/>
    <Control Id="TRAGETSEGMENTCODE"
Title="IDS_TARGETSEGMENTCODE_FIELD_TITLE"
DataType="DTYPE_TEXT" BCField="Segment_spcCode"
ChildBCField=""/>
    <Control Id="MYFLAG" Title="IDS_MYFLAG_FIELD_TITLE"
DataType="DTYPE_BOOL" BCField="Owner" ChildBCField=""/>
    <Control Id="STARTDATE"
Title="IDS_STARTDATE_FIELD_TITLE"
DataType="DTYPE_DATE" BCField="Start_spcDate"
ChildBCField=""/>
    <Control Id="ENDDATE"
```

-continued

```
Title="IDS_ENDDATE_FIELD_TITLE" DataType="DTYPE_DATE"
BCField="End_spcDate"
ChildBCField=""/>
    <Control Id="RELEASEDATE"
Title="IDS_RELEASEDATE_FIELD_TITLE"
DataType="DTYPE_DATE" BCField="Release_spcDate"
ChildBCField=""/>
</Component>
```

For messages:

```
<Component Id="SEARCH_TITLE_ID"
Title="IDS_SEARCH_CONTAINER_TITLE" H="" W="">
    <Control Id="NAME" Title="IDS_NAME_FIELD_TITLE"
DataType="DTYPE_TEXT" BCField="Name" ChildBCField=""/>
    <Control Id="SUBTYPE" Title="IDS_TYPE_FIELD_TITLE"
DataType="DTYPE_TEXT" BCField="SubType" ChildBCField=""/>
    <Control Id="PRODUCTDETAIL"
Title="IDS_PRODUCT_FIELD_TITLE" DataType="DTYPE_TEXT"
BCField="Product_spcDetail_spcName" ChildBCField=""/>
    <Control Id="EXTERNALAUTHOR"
Title="IDS_EXTERNALAUTHOR_FIELD_TITLE"
DataType="DTYPE_TEXT" BCField="External_spcAuthor"
ChildBCField=""/>
    <Control Id="ASSESSMENTTEMPLATE"
Title="IDS_SURVEY_TITLE" DataType="DTYPE_TEXT"
BCField="Assessment_spcTemplate" ChildBCField=""/>
    <Control Id="INDICATION" Title="IDS_INDICATION"
DataType="DTYPE_TEXT" BCField=""
ChildBCField="Indication"/>
    <Control Id="DECISIONISSUE" Title="IDS_DECISIONISSUE"
DataType="DTYPE_TEXT" BCField=""
ChildBCField="Product_spcIssue"/>
    <Control Id="RATING" Title="IDS_RATING_FIELD_TITLE"
DataType="DTYPE_PICKLIST" BCField="" ChildBCField=""/>
    <Control Id="RELEASEDATE"
Title="IDS_RELEASEDATE_FIELD_TITLE"
DataType="DTYPE_DATE" BCField="Release_spcDate"
ChildBCField=""/>
    <Control Id="EXPIRYDATE"
Title="IDS_EXPIREDATE_FIELD_TITLE"
DataType="DTYPE_DATE" BCField="Expire_spcDate"
ChildBCField=""/>
    <Control Id="LASTUPDATEDDATE"
Title="IDS_LASTUPDATEDDATE_FIELD_TITLE"
DataType="DTYPE_DATE" BCField="Updated" ChildBCField=""/>
</Component>
```

An instance of a control would appear as this:

```
<Control Id="NAME" Title="IDS_NAME_FIELD_TITLE"
DataType="DTYPE_TEXT" BCField="Name" ChildBCField=""/>
```

Based on these controls tags, filter panel 1330 displays the appropriate fields. If control tags are removed then corresponding fields from filter panel 1330 will be removed. If new fields are to be added in filter panel 1330, new control tags should be added. To add new fields to filter panel 1330 for messages, the following code can be added to the component definition file:

```
<Component Id="SEARCH_TITLE_ID"
Title="IDS_SEARCH_CONTAINER_TITLE" H="" W="">
......
    <Control Id="NEWFLD" Title="IDS_NEW_FLD_TITLE"
```

-continued

```
DataType="DTYPE_TEXT" BCField="NewField" ChildBCField=""/>
    ..................
    </Component>
```

To add new fields to filter panel 1330 for messaging plans, the following code can be added to the component definition file:

```
<Component Id="SEARCH_TITLE_MP"
Title="IDS_SEARCH_CONTAINER_TITLE" H="" W="">
    ......
    <Control Id="NEWFLD" Title="IDS_NEW_FLD_TITLE"
DataType="DTYPE_TEXT" BCField="NewField" ChildBCField=""/>
    ..................
    </Component>
```

Thus, a PCD system in accordance with an embodiment offers a powerful solution for sales representatives at multiple levels using a customer-centric approach that helps gather unique, actionable insight. The system makes it easier for sales representatives to deliver high impact presentations that are tailored to individual customer needs by leveraging multimedia visualization content provided by marketing teams. As a result, sales teams are better positioned to deliver the right message to the right customer at the right time, helping to optimize each selling opportunity and improve customer acquisition, satisfaction, and retention.

The system provides a detailing solution that is interactive and uses multimedia visualization for presentation to better impress and convince the customers, given the same time slot, than that of the traditional approach. In the few minutes that is available to sales representative, the can present a short movie or animated images on the details of the product, which is more effective than simple oral communication. Additionally, the system instantly collects analytical data such as the time spent by the sales representative on each presentation message and the audience feedback on each message, the sequence of messages, etc. This data helps in evaluating the effectiveness of the presentation material, and this will help brand/product managers to develop improved marketing strategies and sales operation managers to come up with better sales approaches.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A computer-implemented method for recording details and analytics about a sales call presentation, comprising:
   storing, by a processor, presentation material in the form of digital content in a memory;
   creating, by the processor, one or more messaging plans from the presentation material, wherein each messaging plan comprises a sequence of the presentation material, wherein each messaging plan is created separately from the presentation material, wherein each messaging plan further comprises at least one of a related message or a detailed message, wherein a message comprises a segment of the presentation material, and wherein the at least one related or detailed message is not part of the presentation, but is displayed during the presentation in response to a decision by a presenter;
   associating, by the processor, at least one messaging plan of the one or more messaging plans with an objective code;
   providing, by the processor, a first user interface to allow the presenter to select a presentation by selecting a messaging plan from the one or more messaging plans, wherein the first user interface comprises a search component loaded from a component definition file, and wherein the search component allows users to search one or more messages or one or more messaging plans;
   configuring, by the processor, one or more fields of the search component that are used to search a message or a messaging plan based on the component definition file;
   providing, by the processor, a second user interface to allow the presenter to enter details about the sales call before the sales call, wherein the details comprise an objective of the sales call;
   recommending, by the processor, at least one messaging plan of the one or more messaging plans, wherein the objective code of the at least one messaging plan matches the objective of the sales call; and
   recording, by the processor, analytical data of the presentation in real-time and storing the analytical data in a memory.

2. The method of claim 1, wherein the analytical data includes at least one of: duration of the presentation, amount of time spent on each segment of the presentation, sequence of slides in the presentation, and audience feedback in reaction to the presentation.

3. The method of claim 1, further comprising providing a third user interface to allow creation of a presentation using a drag-and-drop operation.

4. The method of claim 1, further comprising providing a language option, wherein textual elements of the first and second user interfaces are loaded from an XML file based on a language identifier.

5. The method of claim 1, wherein components of the second user interface are loaded from the component definition file.

6. The method of claim 1, wherein the second user interface further allows the presenter to enter details after the sales call.

7. The method of claim 1, wherein the sales call is a pharmaceutical sales call.

8. The method of claim 1, wherein the analytical data is used in part to assess the presentation.

9. The method of claim 1, further comprising:
   associating, by the processor, the at least one messaging plan of the one or more messaging plans with a target segment code;
   wherein the details of the sales call further comprise a contact detail;
   wherein the target segment code of the at least one messaging plan matches the contact detail; and
   wherein the objective code represents the objective of the sales call, and wherein the target segment code represents a contact of the sales call.

10. A non-transitory computer-readable medium having instructions stored thereon that, when executed by a processor, cause the processor to record details and analytics about a sales call presentation by:
   storing presentation material in the form of digital content in a memory;
   creating one or more messaging plans from the presentation material, wherein each messaging plan comprises a sequence of the presentation material, wherein each messaging plan is created separately from the presentation material, wherein each messaging plan further comprises at least one of a related message or a detailed message, wherein a message comprises a segment of the presentation material, and wherein the at least one related or detailed message is not part of the presentation, but is displayed during the presentation in response to a decision by a presenter;

associating at least one messaging plan of the one or more messaging plans with an objective code;

providing a first user interface to allow the presenter to select a presentation by selecting a messaging plan from the one or more messaging plans, wherein the first user interface comprises a search component loaded from a component definition file, and wherein the search component allows users to search one or more messages or one or more messaging plans;

configuring one or more fields of the search component that are used to search a message or a messaging plan based on the component definition file;

providing a second user interface to allow a presenter to enter details about the sales call, wherein the details comprise an objective of the sales call;

recommending at least one messaging plan of the one or more messaging plans, wherein the objective code of the at least one messaging plan matches the objective of the sales call; and recording analytical data of the presentation in real-time and storing the analytical data in a memory.

11. The computer-readable medium of claim 10, wherein the analytical data includes at least one of: duration of the presentation, amount of time spent on each segment of the presentation, sequence of slides in the presentation, and audience feedback in reaction to the presentation.

12. The computer-readable medium of claim 10, further comprising providing a third user interface to allow creation of a presentation using a drag-and-drop operation.

13. The computer-readable medium of claim 10, further comprising providing a language option, wherein textual elements of the first and second user interfaces are loaded from an XML file based on a language identifier.

14. The computer-readable medium of claim 10, wherein components of the second user interface are loaded from the component definition file.

15. The computer-readable medium of claim 10, wherein the second user interface further allows the presenter to enter details after the sales call.

16. The computer-readable medium of claim 11, wherein the sales call is a pharmaceutical sales call.

17. A system for recording details and analytics about a sales call presentation, comprising:

a memory storing instructions for recommending at least one messaging plan, wherein an objective code of the at least one messaging plan matches an objective of a sales call, configuring one or more fields of a search component that are used to search a message or a messaging plan based on a component definition file, selecting a messaging plan, presenting a sales presentation to at least one audience member using the messaging plan including recording analytical data of the presentation comprising the duration of the presentation, amount of time spent on each segment of the presentation, and sequence of slides in the presentation, wherein the analytical data is used in part to assess the success of the presentation, and wherein the memory stores presentation material in the form of digital content in a memory; and a processor executing the instructions, wherein the messaging plan comprises a sequence of the presentation material, wherein each messaging plan is created separately from the presentation material, wherein each messaging plan further comprises at least one of a related message or a detailed message, wherein a message comprises a segment of the presentation material, and wherein the at least one related or detailed message is not part of the presentation, but is displayed during the presentation in response to a decision by a presenter.

* * * * *

UNITED STATES PATENT AND TRADEMARK OFFICE
CERTIFICATE OF CORRECTION

PATENT NO. : 8,452,640 B2
APPLICATION NO. : 12/363411
DATED : May 28, 2013
INVENTOR(S) : Kumar et al.

It is certified that error appears in the above-identified patent and that said Letters Patent is hereby corrected as shown below:

On title page 2, in column 2, item [56] under "Other Publications", line 9, delete "Oracel" and insert -- Oracle --, therefor.

On title page 2, in column 2, item [56] under "Other Publications", line 19, delete "Inglhein" and insert -- Ingelheim --, therefor.

Signed and Sealed this
First Day of October, 2013

Teresa Stanek Rea
*Deputy Director of the United States Patent and Trademark Office*